United States Patent [19]
Gilliam

[11] Patent Number: 5,842,704
[45] Date of Patent: Dec. 1, 1998

[54] CHUCK JAW AND QUICK CHANGE JAW INSERTS

[76] Inventor: Maxie Gilliam, 138 Imperial Dr., Friendswood, Tex. 77546

[21] Appl. No.: 905,847

[22] Filed: Aug. 4, 1997

[51] Int. Cl.$^6$ ..................................................... B23B 31/16
[52] U.S. Cl. ............................................ 279/124; 279/153
[58] Field of Search ................................. 279/123, 110, 279/124, 152, 153

[56] References Cited

U.S. PATENT DOCUMENTS

| 3,190,666 | 6/1965 | Testa | 279/123 |
|---|---|---|---|
| 3,679,221 | 7/1972 | Behrens | 279/110 |
| 3,868,120 | 2/1975 | Blattry et al. | 279/123 |
| 5,292,139 | 3/1994 | Gaillard | 279/123 |
| 5,524,910 | 6/1996 | Chase et al. | 279/153 |

OTHER PUBLICATIONS

H&R Manufacturing and Supply Inc. Catalog pp. 16, 17 (undated).
Lock–Jaw™ publication (undated).

*Primary Examiner*—Steven C. Bishop
*Attorney, Agent, or Firm*—Michael B. Jolly

[57] ABSTRACT

A chuck jaw assembly for securing work material upon a machine tool, the assembly includes a jaw and replaceable inserts. The jaw provides a mounting means allowing jaw inserts to be quickly replaced by removing one screw, furthermore inserts are provided which allow both larger diameter and smaller diameter work pieces to be accomodated without replacing the jaws.

4 Claims, 4 Drawing Sheets

CHUCK JAW AND QUICK CHANGE JAW INSERTS

BACKGROUND OF THE INVENTION

This invention relates to a chuck jaw assembly for machine tools such as CNC lathes, mills, and other machines which perform rotational cutting operations. Typically, production machine work requires that a work piece to be cut must be secured within a chuck and repositioned and resecured numerous times during the course of machining the work piece. Chucks normally include three or four dependent or independent jaws. The jaws move on radial ways either away or toward a centerline axis of the chuck. Dependent jaws move in unison on the ways while independent jaws must be moved separately. The distance of travel for the jaws on the ways limits the size of the work piece which can be secured by the chuck jaws without repositioning the jaws on the ways. Normally, chuck jaws are changed to accommodated securing larger or smaller diameter work pieces upon the chuck. Changing chuck jaws requires considerable time since removal of at least two screws for each jaw is necessary, while reassemble requires realignment of the jaws. Chuck jaw inserts have been developed which allow the chuck jaws to remain installed upon the chuck, while inserts are replaced to accommodate different size work pieces. The inserts are provided either as a sacrificial soft insert, which may be custom sized for a particular job, or a hard jaw insert which provides frictional gripping surfaces for securing the work piece.

Although the prior art has provided very useful chuck jaws and chuck jaw inserts, these devices still require considerable down time for the production machinist when work piece diameter changes and inserts or jaws must be changed. A quick change jaw insert marketed by H & R Manufacturing and Supply, Inc. provides jaw inserts that are changeable by removal of a single bolt, however four separate master jaws are also provided to reposition the mounting of the inserts to accommodate varying work piece diameter. LOCK JAW™ marketed by Quick Change Specialties of Houston, Tex. provides jaw inserts which are lockably secured upon a receiving jaw. When changing from smaller to larger diameter work pieces the chuck jaws must be changed and the insert securing pin must be removed requiring considerable down time.

The present invention includes a chuck jaw which provides two mounting surfaces for jaw inserts allowing the chuck to accommodate both smaller diameter work pieces and larger diameter work pieces without the need for changing or repositioning the chuck jaws. Additionally, inserts are changed by removal of a single screw, while the jaws are changed by removal of two screws without the need of removing insert securing pins. Furthermore the inserts may be either soft or hard inserts depending upon the particular application. Changeable jaw inserts allow the work piece to vary in diameter of about three inches, before repositioning the jaws becomes necessary.

SUMMARY OF THE INVENTION

It is accordingly an object of the present invention to provide a chuck jaw system for installation upon a lathe or mill chuck including a multiplicity of jaws which include a means for securely and quickly replacing jaw inserts for either small or larger diameter work pieces without replacing or repositioning the jaws.

Furthermore, it is an object of the present invention to provide a chuck jaw and changeable insert combination which allows the chuck to be used for both smaller and larger diameter work pieces varying in diameter of about three inches without the need for changing jaws, thus saving the production machinist considerable time when work pieces diameter changes.

DETAILED DESCRIPTION OF THE DRAWINGS

Figure 1:
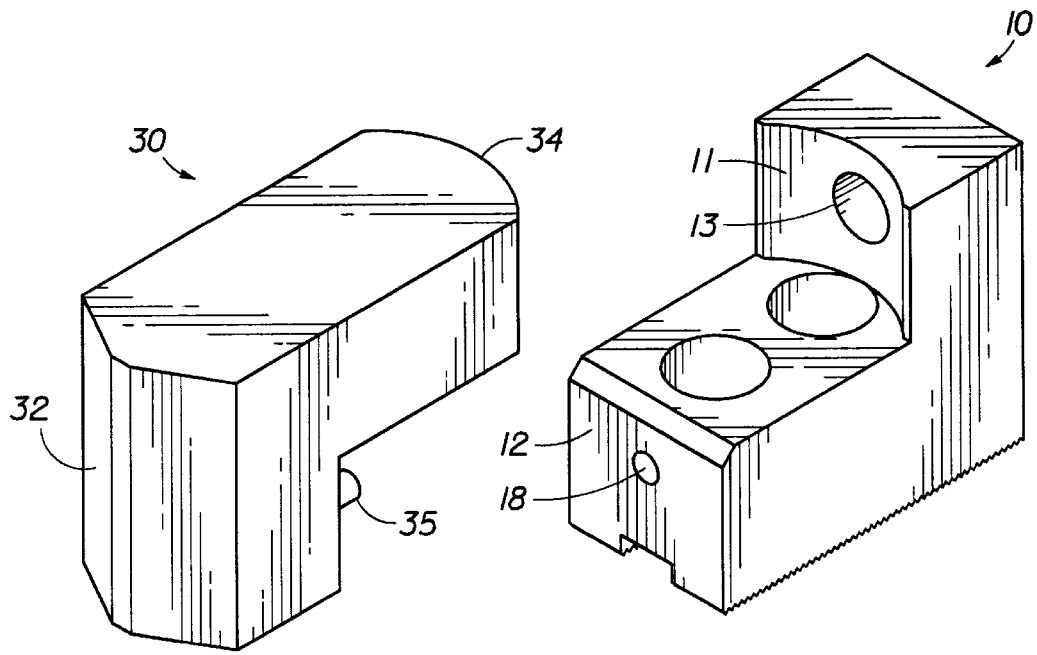
FIG. 1 is a disassembled perspective of the jaw and insert for smaller diameter work.
Figure 2:
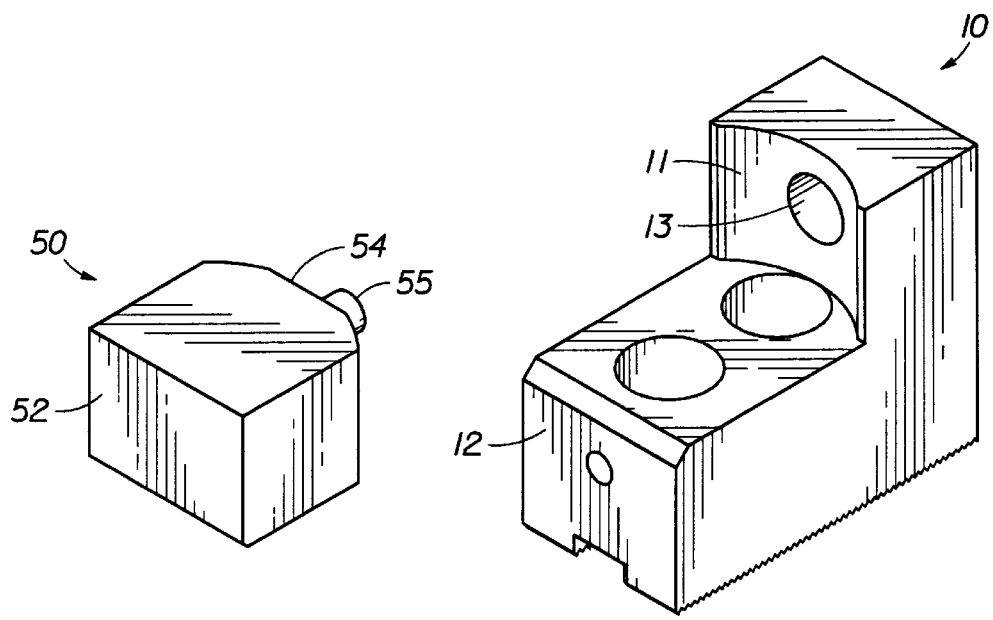
FIG. 2 is a disassembled perspective of the jaw and insert for larger diameter work.
Figure 3:
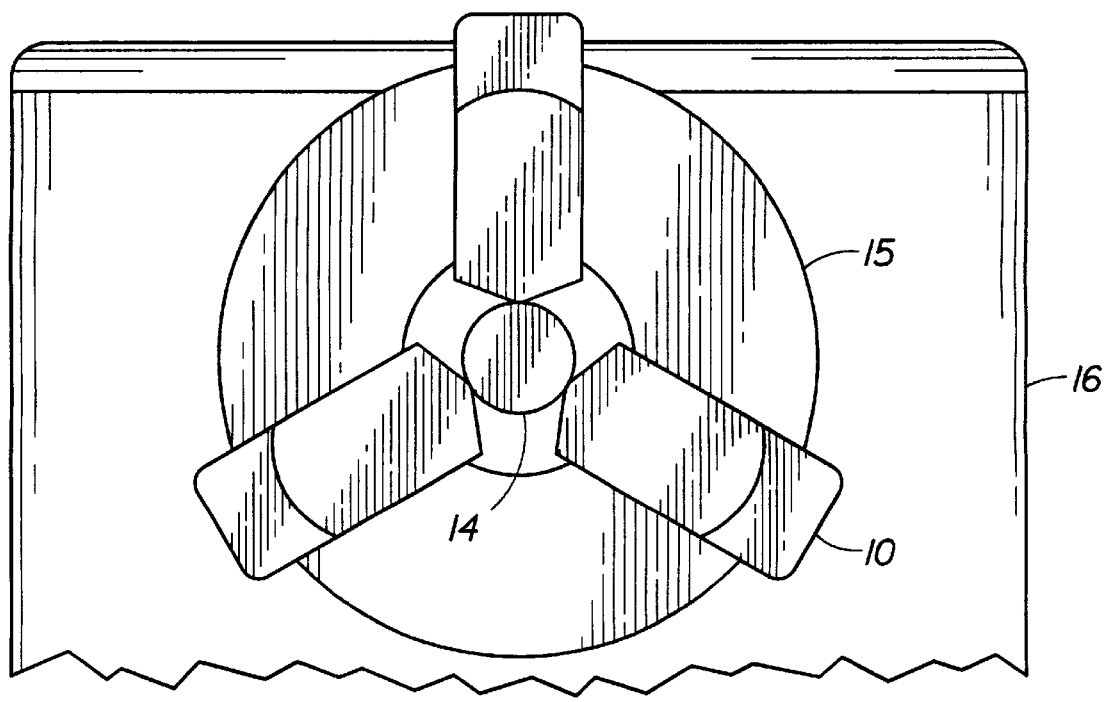
FIG. 3 is an end view of a chuck mechanism on a machine tool illustrating the jaws and inserts grasping a smaller diameter work piece.
Figure 4:
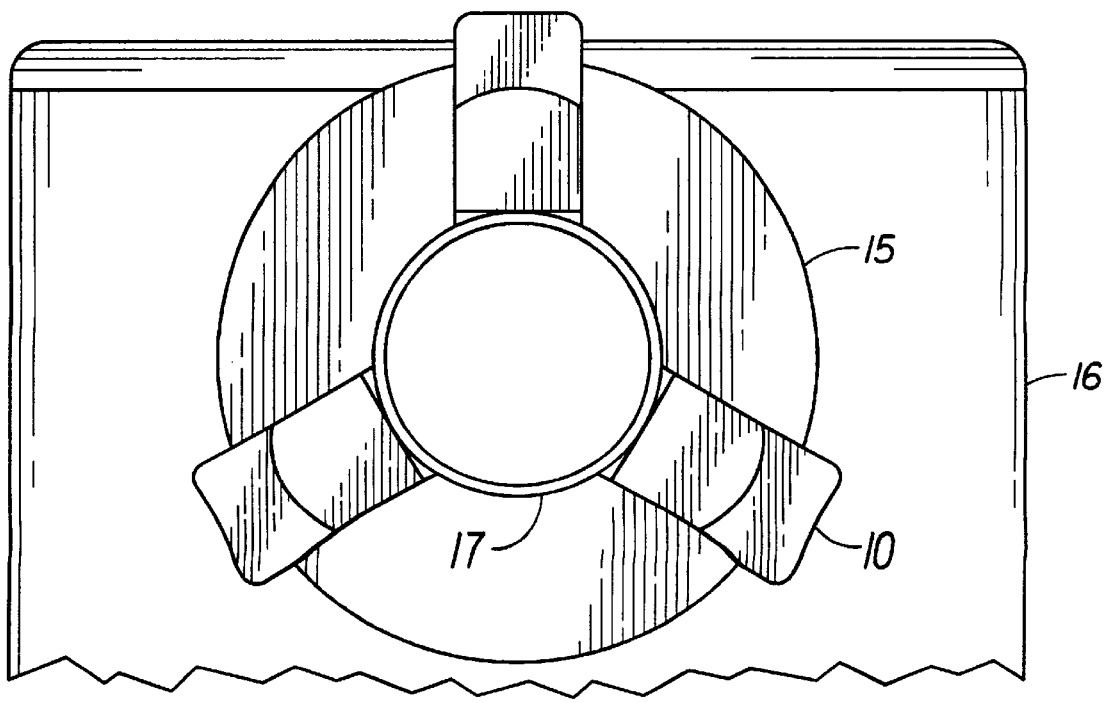
FIG. 4 is an end view of a chuck mechanism on a machine tool illustrating the jaws and inserts grasping a larger diameter work piece.
Figure 5:
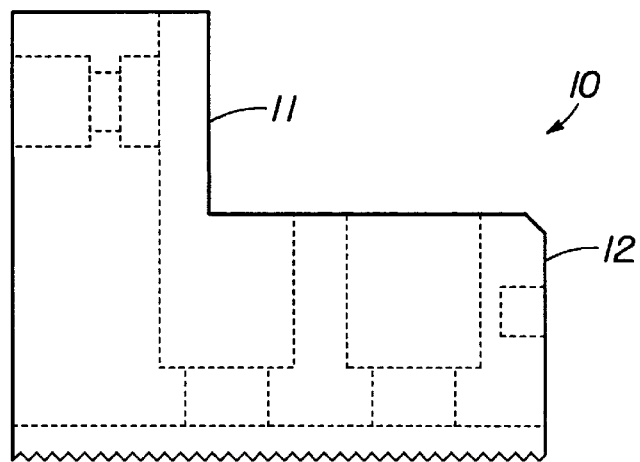
FIG. 5 is a cross sectional side view of a jaw.
Figure 6:
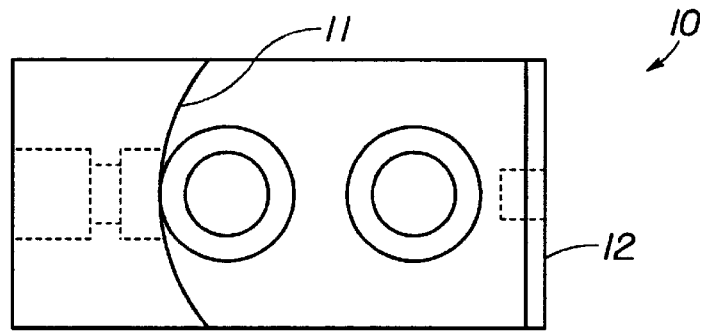
FIG. 6 is a top view of the jaw.
Figure 7:
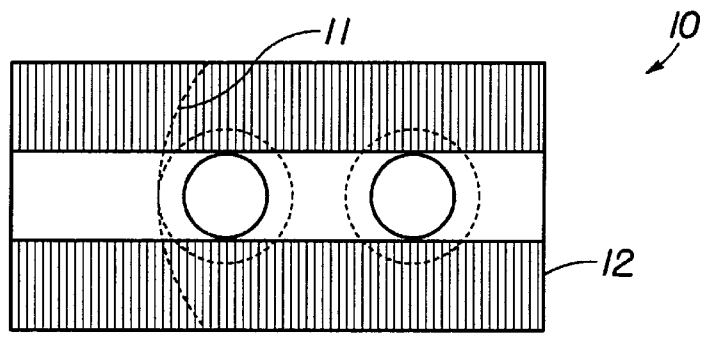
FIG. 7 is a bottom view of the jaw illustrating the jaws serrations.
Figure 8:
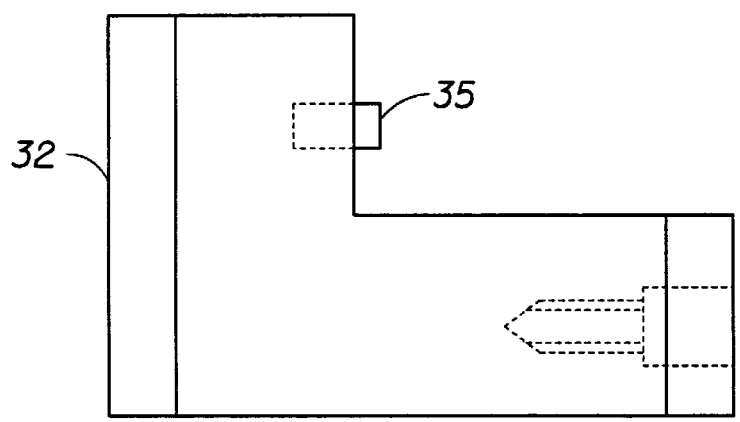
FIG. 8 is a cross sectional side view of an insert for smaller diameter work pieces.
Figure 9:
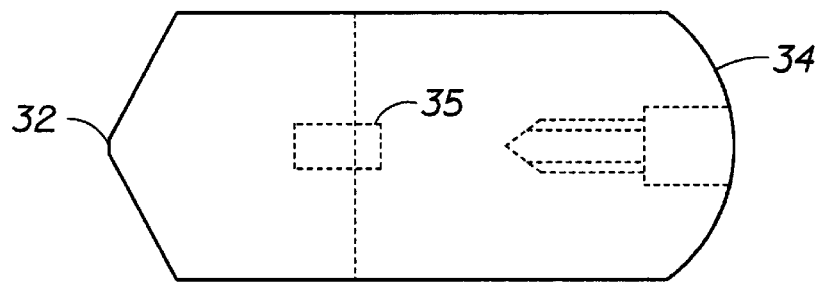
FIG. 9 is a top cross sectional view of an insert for smaller diameter work pieces.
Figure 10:
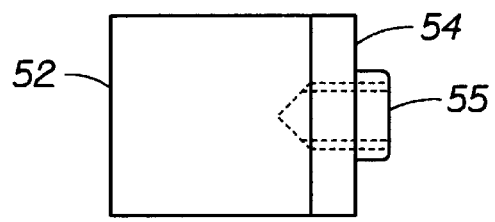
FIG. 10 is a side cross sectional view of an insert for larger diameter work pieces.
Figure 11:
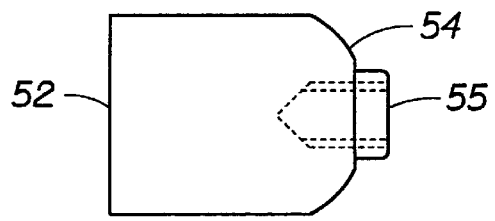
FIG. 11 is a top cross sectional view of an insert for larger diameter work pieces.

FIGS. 1 and 2 illustrate the jaw 10 and jaw inserts for both smaller diameter work material 30 and jaw inserts for larger diameter work 50. The jaws 10 are adaptable to be installed upon standard chucks for CNC lathes and mills. FIGS. 3 and 4 illustrate the jaws 10 grasping a smaller diameter work piece 14 and a larger diameter work 17 which is mounted for rotation on a machine tool 16. The jaws 10 are radially and evenly spaced around the chuck 15 on the machine 16 and move on ways either toward or away from a centerline axis of the chuck to grasp the work piece 14. Further, with automated chucks, the distance of travel for the jaws is limited and consequently the jaws must be repositioned in the ways if a significantly larger or smaller work piece is to be grasped. This invention allows the work piece to vary up to about three inches before repositioning of the jaws is necessary. The invention's unique jaw insert mounting means has two insert mounting surfaces, one primary mounting surface 11 with an insert screw mounting aperture 13 for securing the insert to the jaw and one secondary mounting surface 12 used for additional support for inserts adaptable for smaller diameter work material. The jaws 10 may be adapted to chucks which any number of jaws, chucks which different means of securing the jaws and chucks that have either dependent of independent jaws, and other types of machine tools. Additionally, the figures disclose a serrated means for positioning the jaws to the chuck ways, other means known to those skilled in the art may be employed, such as tongue and groove, serrated keyed, squared serrated keyed, or serrations at different angles.

The jaws 10 are constructed of most preferably tempered metal and in the general shape of a rectangular stepped block with the risers of the steps forming two insert mounting surfaces having a plane parallel with the centerline axis of rotation of the chuck. The mounting surfaces are stepped as illustrated in FIGS. 1 and 2 and face toward the centerline axis of the chuck. The primary surface 11 is further away from the center axis than the secondary mounting surface 12. The primary mounting surface 11 provides a mounting surface for inserts adaptable for larger diameter work pieces. Since additional space in needed at the center of the chuck to grasp larger diameter material, the smaller inserts 50, which is mounted further away from the center of rotation provides more space without moving the jaw on the chuck. The secondary surface provides an additional mounting surface for the dimensionally larger insert 30, which is used on smaller diameter work material. The additional mounting surface is required and preferred since tangential flexing of the insert may occur if it were mounted from the primary mount only. This additional secondary mount allows for the placement of a broad assortment of inserts ranging in size of about ½ inch for the smaller insert 50 and about 3½ inches for the larger insert, when measured from the insert's work grasping surface 32 and 52 to the insert's primary mounting surface 34 and 54.

The jaw primary mounting surface 11 as shown is arched with a mounting screw aperture 13 centrally positioned on the arched surface. The arched surface provides a natural valley for receiving the insert to be mounted and when the mounting screw to tightened the insert is securely placed in position. Other means may be employed to maintain the insert in position on the jaw primary mounting surface such as a tongue and groove arrangement. The smaller insert 50 includes a doweled and threaded aperture 55 for mounting the insert, the dowel is inserted into aperture 13 and aids in securing the insert. The larger insert 30 does not include an equivalent dowel. The secondary mounting surface 12 is substantially flat and has a centrally located dowel aperture 18 for receiving dowel 35, this additional mounting dowel is necessary, as described for preventing flex of the longer insert.

The inserts may be provided in a number of dimensions, the length of the smaller insert is limited by its ability to resist flex and is should be no longer than about two inches, the length of the longer insert is likewise limited and should be limited to about four inches. The inserts may be constructed of mild steel and function as a "soft jaw" or of hardened steel and function as a "hard jaw". The inserts may be customized or include hardened points for added grasping force if necessary.

I claim:

1. Jaw and jaw inserts adaptable to be installed on chucks with a multiplicity of evenly spaced ways on which the jaws are mounted and which jaws travel either toward or away from a centerline rotational axis of the chuck in order to grasp work material on a rotational machine tool, the jaw inserts are adaptable to be changed from the jaw without removing the jaw from the chuck, additionally work material which varies in diameter by about three inches may be accommodated by the jaws by changing jaw inserts, the jaw and insert, comprising:

a) a jaw in the general shape of a stepped rectangle having mounting apertures providing a means for mounting the jaw to the chuck way and a serrated surface which engages serrations on the chuck locking the jaw in place on the chuck way, said mounting apertures extending from an upper surface of a lower step of the jaw through the jaw to the serrated surface, b) primary and secondary jaw insert mounting surfaces positioned upon a riser of each step on the jaw, said jaw insert mounting surfaces having a plane parallel to each other and to the centerline axis of the chuck, the mounting surface planes further facing the centerline axis, the primary mounting surface being positioned further away from the centerline axis than the secondary mounting surface, the primary mounting surface further being arched and having an insert mounting screw aperture extending through the arched primary mounting surface to a jaw back surface, providing a means for removing the insert mounting screw from the back surface of the jaw, said insert mounting aperture also providing a means for receiving an insert mounting dowel, the secondary mounting surface being parallel to the jaw back surface and perpendicular to the lower step upper surface, the secondary mounting surface further having a dowel aperture for receiving an insert secondary mounting dowel, c) a multiplicity of jaw inserts comprising jaw inserts for larger diameter work material and jaw inserts for smaller diameter work, d) larger diameter jaw inserts comprising a substantially square metal block having a mounting surface and a work grasping surface parallel to the mounting surface, said mounting surface being arched to match the arched jaw primary mounting surface and a mounting dowel which is received by the primary mounting surface dowel aperture, a threaded aperture centrally disposed within the mounting dowel providing a means for securing the insert to the mounting surface with a screw extending through the mounting aperture in the insert, the distance between the arched mounting surface and the work grasping surface being between about one half inch to about two inches, and e) smaller diameter inserts comprising a rectangular metal block with stepped primary and secondary mounting surfaces, the mounting surfaces being parallel to a work grasping surface, a primary mounting surface dimensioned to be received by the arched jaw primary mounting surface and the secondary surface being dimensioned to be received by the jaw secondary mounting surface, a threaded aperture centrally disposed on the arched primary mounting surface for receiving a mounting screw through the jaw back surface to the insert and a positioning dowel centrally located on the secondary mounting surface providing additional secured positioning of the insert, the distance between the primary mounting surface and the work grasping surface being between about two and one quarter inches to about four inches.

2. Jaw and jaw inserts adaptable to be installed on chucks with a multiplicity of evenly spaced ways on which the jaws are mounted and which jaws travel either toward or away from a centerline rotational axis of the chuck in order to grasp work material on a rotational machine tool, the jaw inserts are adaptable to be changed from the jaw without removing the jaw from the chuck, additionally work material which varies in diameter by about three inches may be accommodated by the jaws by changing jaw inserts, the jaw and insert, comprising:

a) a means for securing the jaw on the chuck way, which comprises a jaw in the general shape of a stepped rectangle having mounting apertures providing a means for mounting the jaw to the chuck way and a serrated surface which engages serrations on the chuck locking the jaw in place on the chuck way, said mounting apertures extending from an upper surface of a lower step of the jaw through the jaw to the serrated surface, b) primary and secondary jaw insert mounting surfaces positioned upon the jaw, said jaw insert mounting surfaces having a plane parallel to each other and to the centerline axis of the chuck, the mounting surfaces plane further facing the centerline axis, the primary mounting surface being positioned further away from the centerline axis than the secondary mounting surface, c) a means for securing a jaw insert upon the primary mounting surface, and d) a means for securing a jaw insert upon both the primary and the secondary mounting surfaces which comprises primary and secondary jaw insert mounting surfaces positioned upon a riser of each step on the jaw, said jaw insert mounting surfaces having a plane parallel to each other and to the centerline axis of the chuck, the mounting surface planes further facing the centerline axis, the primary mounting surface being positioned further away from the centerline axis than the secondary mounting surface, the primary mounting surface further being arched and having an insert mounting screw aperture extending through the arched primary mounting surface to a jaw back surface, providing a means for removing the insert mounting screw from the back surface of the jaw, said insert mounting aperture also providing a means for receiving an insert mounting dowel, the secondary mounting surface being parallel to the jaw back surface and perpendicular to the lower step upper surface, the secondary mounting surface further having a dowel aperture for receiving an insert secondary mounting dowel.

3. Jaw and jaw inserts adaptable to be installed on chucks with a multiplicity of evenly spaced ways on which the jaws are mounted and which jaws travel either toward or away from a centerline rotational axis of the chuck in order to grasp work material on a rotational machine tool, the jaw inserts are adaptable to be changed from the jaw without removing the jaw from the chuck, additionally work material which varies in diameter by about three inches may be accommodated by the jaws by changing jaw inserts, the jaw and insert, comprising:

a) a means for securing the jaw on the chuck way, b) primary and secondary jaw insert mounting surfaces positioned upon the jaw, said jaw insert mounting surfaces having a plane parallel to each other and to the centerline axis of the chuck, the mounting surfaces plane further facing the centerline axis, the primary mounting surface being positioned further away from the centerline axis than the secondary mounting surface, c) a means for securing a jaw insert upon the primary mounting surface, and d) a means for securing a jaw insert upon both the primary and the secondary mounting surfaces, and e) a multiplicity of jaw inserts comprising jaw inserts for larger diameter work material and jaw inserts for smaller diameter work wherein said larger diameter jaw inserts comprise a substantially square metal block having a mounting surface and a work grasping surface parallel to the mounting surface, said mounting surface being arched to match the arched jaw primary mounting surface and a mounting dowel which is received by the primary mounting surface dowel aperture, a threaded aperture centrally disposed within the mounting dowel providing a means for securing the insert to the mounting surface with a screw extending through the mounting aperture in the insert, the distance between the arched mounting surface and the work grasping surface being between about one half inch to about two inches.

4. Jaw and jaw inserts adaptable to be installed on chucks with a multiplicity of evenly spaced ways on which the jaws are mounted and which jaws travel either toward or away from a centerline rotational axis of the chuck in order to grasp work material on a rotational machine tool, the jaw inserts are adaptable to be changed from the jaw without removing the jaw from the chuck, additionally work material which varies in diameter by about three inches may be accommodated by the jaws by changing jaw inserts, the jaw and insert, comprising:

a) a means for securing the jaw on the chuck way, b) primary and secondary jaw insert mounting surfaces positioned upon the jaw, said jaw insert mounting surfaces having a plane parallel to each other and to the centerline axis of the chuck, the mounting surfaces plane further facing the centerline axis, the primary mounting surface being positioned further away from the centerline axis than the secondary mounting surface, c) a means for securing a jaw insert upon the primary mounting surface, and d) a means for securing a jaw insert upon both the primary and the secondary mounting surfaces, and e) a multiplicity of jaw inserts comprising jaw inserts for larger diameter work material and jaw inserts for smaller diameter work wherein the smaller diameter inserts comprise a rectangular metal block with stepped primary and secondary mounting surfaces, the mounting surfaces being parallel to a work grasping surface, a primary mounting surface dimensioned to be received by the arched jaw primary mounting surface and the secondary surface being dimensioned to be received by the jaw secondary mounting surface, a threaded aperture centrally disposed on the arched primary mounting surface for receiving a mounting screw through the jaw back surface to the insert and a positioning dowel centrally located on the secondary mounting surface providing additional secured positioning of the insert, the distance between the primary mounting surface and the work grasping surface being between about two and one quarter inches to about four inches.

* * * * *